(12) United States Patent
Taniuchi et al.

(10) Patent No.: US 11,342,608 B2
(45) Date of Patent: May 24, 2022

(54) BATTERY MODULE

(71) Applicant: Honda Motor Co., Ltd., Tokyo (JP)

(72) Inventors: Takuya Taniuchi, Saitama (JP);
Masahiro Ohta, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 136 days.

(21) Appl. No.: 16/724,399

(22) Filed: Dec. 23, 2019

(65) Prior Publication Data

US 2020/0243933 A1 Jul. 30, 2020

(30) Foreign Application Priority Data

Jan. 29, 2019 (JP) .............................. JP2019-012958

(51) Int. Cl.
| | | |
|---|---|---|
| *H01M 10/6554* | (2014.01) | |
| *H01M 10/0563* | (2010.01) | |
| *H01M 10/0562* | (2010.01) | |
| *H01M 10/058* | (2010.01) | |
| *H01M 10/613* | (2014.01) | |
| *H01M 10/04* | (2006.01) | |
| *H01M 50/20* | (2021.01) | |
| *H01M 50/50* | (2021.01) | |

(52) U.S. Cl.
CPC ... *H01M 10/6554* (2015.04); *H01M 10/0413* (2013.01); *H01M 10/058* (2013.01); *H01M 10/0562* (2013.01); *H01M 10/0563* (2013.01); *H01M 10/613* (2015.04); *H01M 50/20* (2021.01); *H01M 50/50* (2021.01)

(58) Field of Classification Search
CPC combination set(s) only.
See application file for complete search history.

(56) References Cited

U.S. PATENT DOCUMENTS

| | | | | |
|---|---|---|---|---|
| 7,749,648 B2 * | 7/2010 | Kim | ................. | H01M 50/121 429/162 |
| 2010/0055558 A1 * | 3/2010 | Choi | ................. | H01M 50/54 429/185 |
| 2010/0266881 A1 * | 10/2010 | You | ................. | H01M 50/3425 429/56 |
| 2011/0008665 A1 * | 1/2011 | Yoon | ................. | H01M 10/6551 429/120 |
| 2011/0008666 A1 * | 1/2011 | Yoon | ................. | H01M 10/6554 429/120 |
| 2011/0244296 A1 * | 10/2011 | Okuda | ................. | H01M 10/6553 429/120 |

(Continued)

FOREIGN PATENT DOCUMENTS

| | | |
|---|---|---|
| JP | 2000106154 | 4/2000 |
| JP | 2001006630 | 1/2001 |

(Continued)

OTHER PUBLICATIONS

"Office Action of Japan Counterpart Application" with English translation thereof, dated Feb. 15, 2022, p. 1-p. 8.

*Primary Examiner* — Kaity V Chandler
(74) *Attorney, Agent, or Firm* — JCIPRNET

(57) ABSTRACT

Provided is a battery module having a structure for cooling efficiently without affecting the volume of the entire module. By utilizing dead spaces uniquely present in laminate cells and conducting heat in a lamination direction of electrodes to dissipate the heat, the cooling efficiency is improved without increasing the volume of the entire module.

10 Claims, 3 Drawing Sheets

(56) References Cited

U.S. PATENT DOCUMENTS

| | | | | |
|---|---|---|---|---|
| 2012/0040235 A1* | 2/2012 | Cho | ................... | H01M 50/538 |
| | | | | 429/185 |
| 2013/0130086 A1* | 5/2013 | Schaefer | ........... | H01M 10/6555 |
| | | | | 429/120 |
| 2016/0013526 A1* | 1/2016 | Uchiyama | ............. | H01M 50/24 |
| | | | | 429/71 |
| 2017/0324125 A1* | 11/2017 | Schoenherr | ......... | H01M 50/136 |
| 2018/0219261 A1* | 8/2018 | Drews | ................. | H01M 10/647 |

FOREIGN PATENT DOCUMENTS

| | | | | | |
|---|---|---|---|---|---|
| JP | 2002334692 A | * | 11/2002 | ............. | Y02E 60/10 |
| JP | 2013229266 | | 11/2013 | | |
| JP | 2013243061 | | 12/2013 | | |
| JP | 2014078471 | | 5/2014 | | |
| JP | 2014203792 | | 10/2014 | | |
| JP | 2016024935 | | 2/2016 | | |
| WO | WO-2005096412 A1 | * | 10/2005 | ............. | H01G 11/10 |

\* cited by examiner

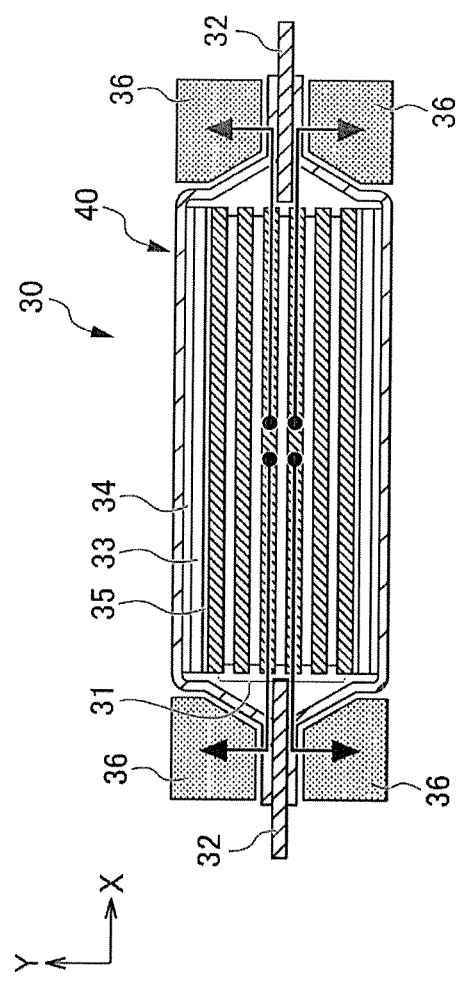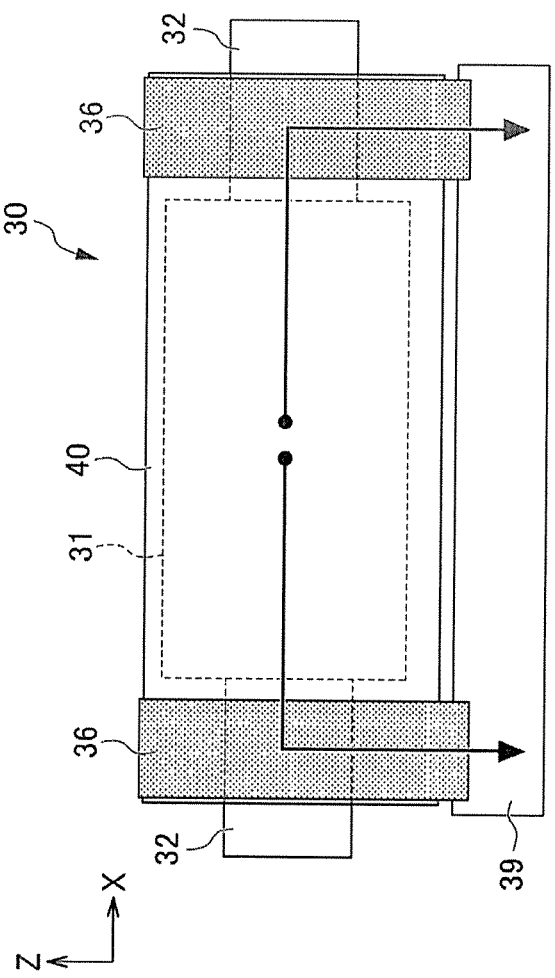
FIG. 2A
FIG. 2B

BATTERY MODULE

CROSS REFERENCE TO RELATED APPLICATIONS

This application claims the priority benefit of Japanese Patent Application No. 2019-012958, filed on Jan. 29, 2019. The entirety of the above-mentioned patent application is hereby incorporated by reference herein and made a part of this specification.

BACKGROUND

Technical Field

The disclosure relates to a battery module. More specifically, the disclosure relates to a battery module having a structure for cooling efficiently without affecting the volume of the entire module.

Related Art

Conventionally, as a secondary battery having high energy density, a lithium ion secondary battery has been widely used. The lithium ion secondary battery has a structure in which a separator is present between a positive electrode and a negative electrode, and liquid electrolyte (electrolytic solution) is filled.

The electrolytic solution of the lithium ion secondary battery is usually a flammable organic solvent, and thus there are cases where safety against heat is particularly problematic. Therefore, a solid battery is proposed which uses an inorganic solid electrolyte instead of the organic liquid electrolyte (see patent literature 1: Japanese Patent Application Laid-Open No. 2000-106154).

The solid secondary battery includes a solid electrolyte layer as an electrolyte layer between the positive electrode and the negative electrode, and a plurality of the configurations with the positive electrode, the solid electrolyte, and the negative electrode is laminated to configure one battery cell. Compared with a battery using the electrolytic solution, the solid battery configured by the solid electrolytes can eliminate the heat problem and be increased in capacity and/or voltage by lamination, and can also meet a demand for compactness.

Here, the conventional liquid secondary battery filled with the liquid electrolyte (the electrolytic solution) has, for the purpose of suppressing temperature rise inside the battery and securing safety, a cooling structure in which the cells are clamped by metal plates or the like, and the heat generated in the cells is transferred through the metal plates and is dissipated to a cooling medium present outside the cells (see patent literature 2: Japanese Patent Application Laid-Open No. 2001-006630).

In addition, a cooling structure which includes heat transfer plates to promote heat dissipation is also proposed (see patent literature 3: Japanese Patent Application Laid-Open No. 2013-229266). An assembled battery described in patent literature 3 uses the heat transfer plates in which heat collecting portions and heat dissipation portions are continuous in a substantially L shape, the heat collecting portions are connected to current collecting tabs or bus bar, and the heat dissipation portions extend along the other surface of the assembled battery.

However, in the cooling structure described in patent literature 2, a transfer path for the heat generated inside the cells is in a lamination direction of the electrode laminate, and thus the heat is conducted through the path with poor thermal conductivity, and cooling efficiency is poor.

Here, FIGS. 1A-1C show a top view and side views of battery cells configuring a battery module according to a conventional embodiment. The battery module shown in FIGS. 1A-1C are an aspect of a conventional all-solid-state battery. FIG. 1A is the top view of the battery cells, FIG. 1B is a side view from an X-axis direction shown in FIG. 1A, and FIG. 1C is a side view from a Y-axis direction shown in FIG. 1A.

In a battery module 10 according to one known art, a plurality of battery cells 20 is laminated and disposed, and each battery cell 20 includes therein an electrode laminate 1 which is clamped by support plates 3. The electrode laminates 1 include current collecting tabs 2 which extend from end portions, and the current collecting tabs 2 are led out from end portions of the battery cells 20.

In the battery module 10, buffer materials 7 are disposed between adjacent battery cells 20, and laminates of the battery cells 20 are clamped by metal plates 8 and placed on a refrigerant 9. In addition, the metal plates 8 are bent in an approximately L shape, and the bent portions are disposed between the refrigerant 9 and the laminates of the battery cells 20.

In FIGS. 1A-1C, transfer paths for the heat generated inside the battery cells 20 are indicated by arrows. In the conventional battery module 10 shown in FIGS. 1A-1C, the heat transfer paths pass through the electrode laminates 1 in the lamination direction of the electrode laminates 1 from centers of the electrode laminates 1 toward the metal plates 8 for heat collecting. Subsequently, the heat transfer paths descend toward the bent portions of the metal plates 8 bent in a substantially L shape, pass through the bent portions, and reach the refrigerant 9 disposed below the battery cells 20.

Here, heat conduction of the electrode laminates is better in a direction of lamination surfaces of the laminates than in the lamination direction. Therefore, it can be seen that in a battery module having the structure in which transfer paths are formed in the lamination direction of the electrode laminates, the heat is conducted through the paths with poor thermal conductivity, and the cooling efficiency is poor.

In addition, the L-shaped heat transfer plates in the cooling structure described in patent literature 3 are disposed outside battery cell housing portions configuring the battery module. Thus, a volume of the entire battery module becomes large, causing a decrease in energy density of the battery.

In view of the above description, the disclosure provides a battery module having a structure for cooling efficiently without affecting volume of the entire module.

It is found that if dead spaces uniquely present in laminate cells are utilized and heat is conducted in a lamination direction of electrodes to dissipate the heat, the cooling efficiency can be improved without increasing the volume of the module, and the disclosure is accomplished accordingly.

SUMMARY

The disclosure provides a battery module in which a plurality of laminate type battery cells is laminated and disposed, wherein electrode laminates are enclosed in laminate films, the electrode laminates include current collecting tabs extending from end portions, the current collecting tabs are led out from end portions of the laminate type battery cells, and first heat transfer materials are disposed outside the laminate type battery cells in a manner of clamping the current collecting tabs.

BRIEF DESCRIPTION OF THE DRAWINGS

FIGS. 2A and 2B show a top view and a side view of a battery cell configuring a battery module according to one embodiment of the disclosure.

DESCRIPTION OF THE EMBODIMENTS

Figure 1A:
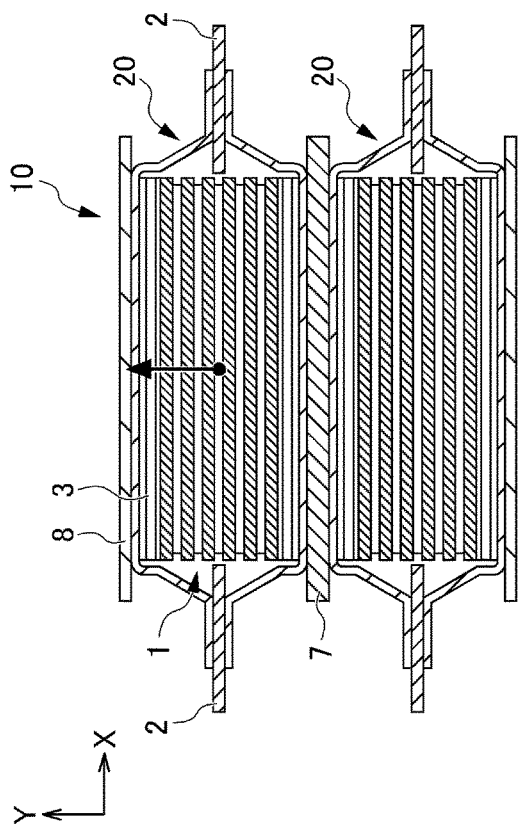
FIGS. 1A-1C show a top view and side views of battery cells configuring a conventional battery module.

Embodiments of the disclosure are described below based on the drawings. However, the following examples only illustrate the disclosure, and the disclosure is not limited thereto.

<Battery Module>

The battery module of the disclosure includes, as essential components, lamination type battery cells, current collecting tabs, and first heat transfer materials. The battery module of the disclosure has a structure in which a plurality of the lamination type battery cells with electrode laminates being enclosed in laminate films is laminated and disposed; the electrode laminates include the current collecting tabs extending from end portions; the current collecting tabs are led out from end portions of the lamination type battery cells; and the first heat transfer materials are disposed outside the lamination type battery cells in a manner of clamping the current collecting tabs.

The lamination type battery cells applicable to the battery module of the disclosure are not particularly limited. The lamination type battery cells may be liquid secondary batteries including a liquid electrolyte or solid batteries including a solid or gel electrolyte. In addition, in the case of battery cells including a solid or gel electrolyte, the electrolyte may be organic or inorganic.

First Embodiment

A battery module of the disclosure according to a first embodiment is described using FIGS. 2A and 2B. FIGS. 2A and 2B show a top view and a side view of a battery cell configuring the battery module according to the first embodiment. FIG. 2A is the top view of the battery cell configuring the battery module, and FIG. 2B is the side view from a Y-axis direction shown in FIG. 2A.

In the battery module 30 shown in FIGS. 2A and 2B, a plurality of battery cells 40 is laminated and disposed (the laminated state is not shown), and each battery cell 40 includes therein an electrode laminate 31 clamped by support plates 33. The electrode laminate 31 includes current collecting tabs 32 extending from end portions, and the current collecting tabs 32 are led out from end portions of the battery cells 40.

In the battery module 30, first heat transfer materials 36 are disposed outside the battery cells 40 in a manner of clamping the current collecting tabs 32 extending from the end portions of the electrode laminate 31. In addition, the battery cells 40 are placed on a refrigerant 39. Moreover, in the battery cells 40 according to the first embodiment, heat transfer sheets 34 are disposed outside the support plates 33, and heat transfer buffer materials 35 are disposed between the electrode laminates 31 and the support plates 33.

In the battery cells 40 configuring the battery module 30 according to the first embodiment shown in FIGS. 2A and 2B, transfer paths for the heat generated inside the battery cells 40 are indicated by arrows. In the battery module 30 shown in FIGS. 2A and 2B, the heat transfer paths pass through the electrode laminates 31 in a direction of lamination surfaces of the electrode laminates 31 from centers of the electrode laminates 31 toward the current collecting tabs 32. Subsequently, the heat transfer paths pass through the current collecting tabs 32 toward the first heat transfer materials 36 disposed outside battery cells 40 to clamp the current collecting tabs 32, descend in the first heat transfer materials 36 and reach the refrigerant 39 disposed below the battery cells 40.

Here, heat conduction of the electrode laminates is better in the direction of the lamination surfaces of the laminates than in the lamination direction. Therefore, in the battery module of the disclosure forming the transfer paths in the direction of the lamination surfaces of the electrode laminates, the heat is conducted through paths with high thermal conductivity, and the cooling efficiency is high.

Moreover, in the battery module 30 according to the first embodiment shown in FIGS. 2A and 2B, the first heat transfer materials 36 are disposed along surfaces of the current collecting tabs 32. In addition, the first heat transfer materials 36 are disposed in regions which are gaps in the conventional battery module (see FIGS. 1A-1C).

In the battery module of the disclosure, the first heat transfer materials are preferably disposed along the surfaces of the current collecting tabs. Thereby, an area which can be utilized for the heat conduction increases, and thus the cooling efficiency can be improved.

Figure 1B:
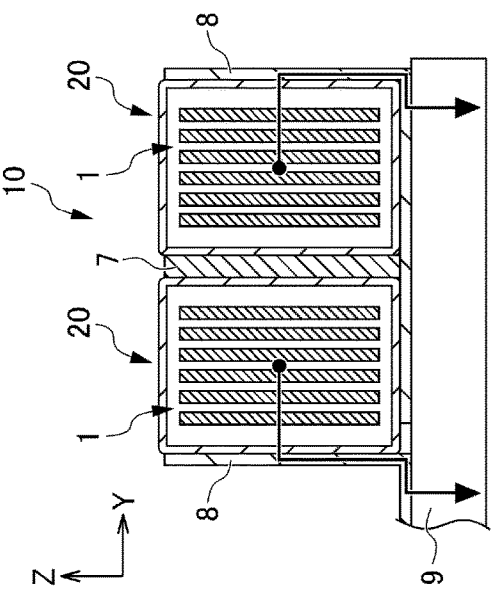
Figure 1C:
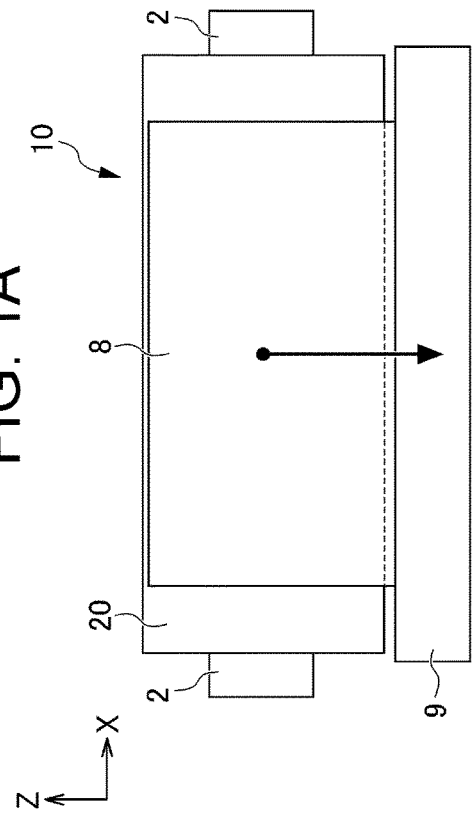

In addition, in the battery module of the disclosure, the first heat transfer materials are preferably disposed in the regions which are gaps in the conventional battery module (see FIGS. 1A-1C). Specifically, in the battery module configured by the lamination type battery cells, the first heat transfer materials are preferably disposed in dead spaces which are present near seal portions of the current collecting tabs.

By utilizing the regions which are conventionally dead spaces, space efficiency can be improved. As a result, an increase in the volume of the entire battery module due to the arrangement of the heat transfer materials can be suppressed, and the energy density of the battery can be suppressed from decreasing.

In addition, if the heat transfer sheets are disposed outside the support plates as in the battery cells according to the first embodiment, the efficiency of the heat conduction can be improved, and the cooling efficiency can be improved as a result.

In addition, if the buffer materials having a heat transfer property are disposed between the electrode laminates and the support plates as in the battery cells according to the first embodiment, the efficiency of the heat conduction is improved and mechanical durability against external forces can be improved, for example, cell cracking due to vibration can be suppressed.

Second Embodiment

Figures 3A, 3B:
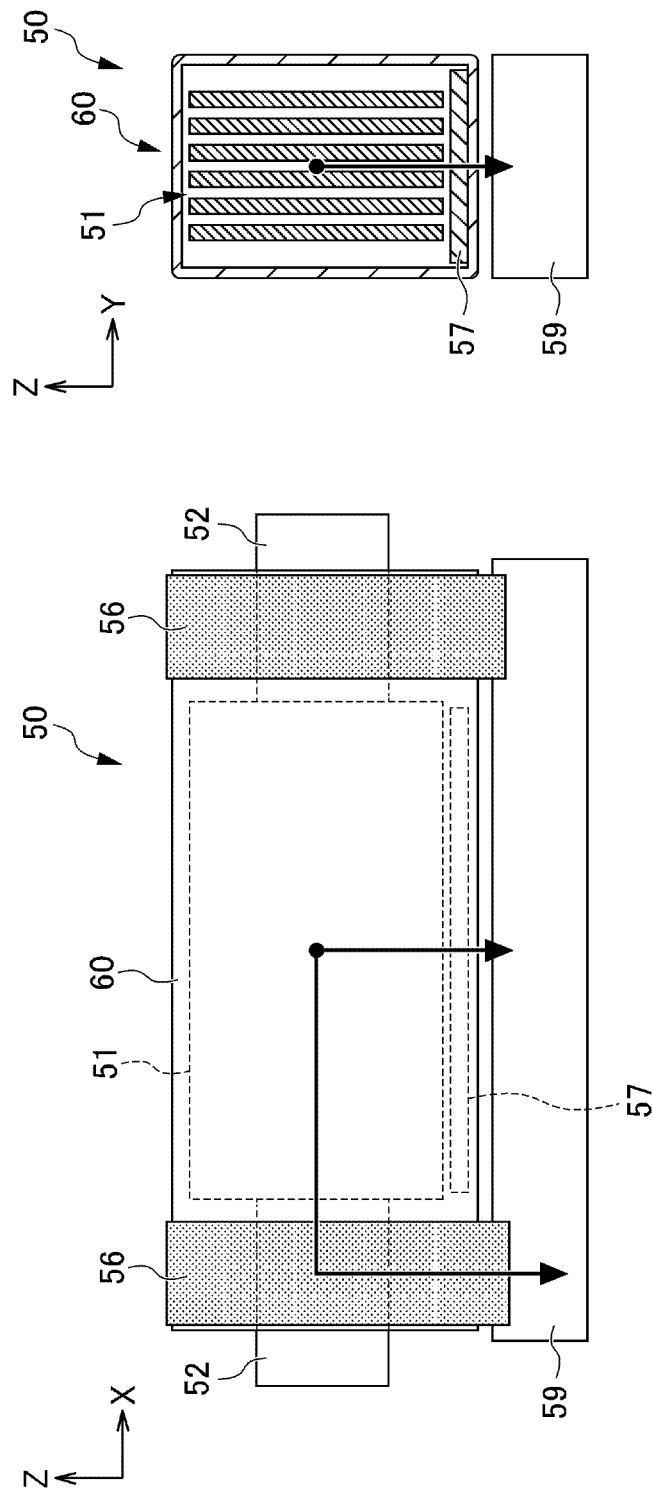
FIGS. 3A and 3B shows side views of a battery cell configuring a battery module according to one embodiment of the disclosure.

A battery module of the disclosure according to a second embodiment is described using FIGS. 3A and 3B. FIGS. 3A and 3B show side views of a battery cell configuring the battery module according to the second embodiment.

In the battery module 50 shown in FIGS. 3A and 3B, a plurality of battery cells 60 is laminated and disposed (the laminated state is not shown), and each battery cell 60 has an electrode laminate 51 inside. The electrode laminates 51 include current collecting tabs 52 extending from end portions, and the current collecting tabs 52 are led out from end portions of the battery cells 60.

In the battery module 50, the same as in the first embodiment shown in FIGS. 2A and 2B, first heat transfer materials 56 are disposed outside the battery cells 60 in a manner of clamping the current collecting tabs 52 extending from the end portions of the electrode laminates 51. In addition, the battery cells 60 are placed on a refrigerant 59.

Moreover, in the battery cells 60 according to the second embodiment, second heat transfer materials 57 are disposed inside the battery cells 60. The second heat transfer materials 57 are disposed in a planar shape along the refrigerant 59 on a surface adjacent to the refrigerant 59 in the lamination direction of the electrode laminates 51 (that is, perpendicular to lamination surfaces).

In the battery cells 60 configuring the battery module 50 according to the second embodiment shown in FIGS. 3A and 3B, transfer paths for the heat generated inside the battery cells 60 are indicated by arrows. In the battery module 50 shown in FIGS. 3A and 3B, as the heat transfer paths, there are two types of paths, that is, first paths the same as the paths in the first embodiment which pass through the first heat transfer materials and second paths unique to the second embodiment which pass through the second heat transfer materials.

Specifically, according to the first paths the same as the first embodiment, the heat generated inside the battery cells 60 passes through the electrode laminates 51 in a direction of lamination surfaces of the electrode laminates 51 from centers of the electrode laminates 51 toward the current collecting tabs 52. Subsequently, the heat passes through the current collecting tabs 52 toward the first heat transfer materials 56 disposed outside the battery cells 60 to clamp the current collecting tabs 52, descends in the first heat transfer materials 56 and reaches the refrigerant 59 disposed below the battery cells 60.

In addition, according to the unique second paths of the second embodiment that passes through the second heat transfer materials, the heat generated inside the battery cells 60 passes through the electrode laminates 51 in the direction of the lamination surfaces of the electrode laminates 51, that is, a direction perpendicular to the first paths, from the centers of the electrode laminates 51 toward the second heat transfer materials 57 disposed inside the battery cells 60. Then, the heat passes through the second heat transfer materials 57 and reaches the refrigerant 59 disposed below the battery cells 60.

Regarding the heat transfer paths of the second embodiment, both the first paths and the second paths are paths which pass in the direction of the lamination surfaces of the electrode laminates. Therefore, the heat conduction efficiency of the battery module of the second embodiment is very high, and remarkable cooling efficiency can be exhibited.

Moreover, the second embodiment in which the second heat transfer materials are included inside the battery cells can be particularly preferably applied when the battery cells are all-solid-state batteries without an electrolytic solution.

<Other Configurations>

That is, the disclosure is a battery module in which a plurality of laminate type battery cells is laminated and disposed, wherein electrode laminates are enclosed in laminate films, the electrode laminates include current collecting tabs extending from end portions, the current collecting tabs are led out from end portions of the laminate type battery cells, and first heat transfer materials are disposed outside the laminate type battery cells in a manner of clamping the current collecting tabs.

The first heat transfer materials may be disposed along surfaces of the current collecting tabs.

The first heat transfer materials may be disposed in gaps of the battery module.

The lamination type battery cells may include second heat transfer materials inside.

The lamination type battery cells may be all-solid-state battery cells.

The lamination type battery cells may have a liquid, solid, or gel electrolyte.

Because the battery module of the disclosure has the structure in which the dead spaces are utilized and the heat is conducted in the direction of the lamination surfaces of the electrode laminate to dissipate the heat, the cooling efficiency can be improved without increasing the volume of the entire module.

That is, because the battery module of the disclosure is a battery module which contributes to space efficiency as well as cooling efficiency, the battery module can satisfy the demands for improvement in energy density and improvement in cooling efficiency at the same time.

Furthermore, because components in the battery can be filled tightly, influence on external forces such as vibration, impact or the like can be reduced, and mechanical durability can be improved.

In the battery module of the disclosure, configurations other than the above configurations are not particularly limited. Materials, methods, and the like known in the field of battery can be applied.

What is claimed is:

1. A battery module in which a plurality of lamination type battery cells with electrode laminates being enclosed in laminate films is laminated and disposed, wherein
   the electrode laminates comprise current collecting tabs extending from end portions of the lamination type battery cells,
   the current collecting tabs are led out from end portions of the lamination type battery cells, and
   first heat transfer materials are disposed outside the lamination type battery cells and outside the end portions of the lamination type battery cells in a manner of clamping the current collecting tabs from two opposite sides of current collecting tabs.

2. The battery module according to claim 1, wherein the first heat transfer materials are disposed along surfaces of the current collecting tabs.

3. The battery module according to claim 2, wherein the first heat transfer materials are disposed in gaps of the battery module.

4. The battery module according to claim 2, wherein the lamination type battery cells comprise second heat transfer materials inside.

5. The battery module according to claim 2, wherein the lamination type battery cells are all-solid-state battery cells.

6. The battery module according to claim 2, wherein the lamination type battery cells have a liquid, solid, or gel electrolyte.

7. The battery module according to claim 1, wherein the first heat transfer materials are disposed in gaps of the battery module.

8. The battery module according to claim 1, wherein the lamination type battery cells comprise second heat transfer materials inside.

9. The battery module according to claim 1, wherein the lamination type battery cells are all-solid-state battery cells.

10. The battery module according to claim 1, wherein the lamination type battery cells have a liquid, solid, or gel electrolyte.

\* \* \* \* \*